Dec. 11, 1951 W. C. ANDERSON 2,578,217

SCREW AND WASHER ASSEMBLY MACHINE

Filed Aug. 15, 1947 8 Sheets-Sheet 1

INVENTOR.
William C. Anderson
BY
Moore, Olson & Trexler
attys.

Dec. 11, 1951 W. C. ANDERSON 2,578,217

SCREEN AND WASHER ASSEMBLY MACHINE

Filed Aug. 15, 1947 8 Sheets-Sheet 2

INVENTOR.

William C. Anderson

BY Moore, Olson & Trexler

Attys.

INVENTOR.
William C. Anderson
BY
Moore, Olson & Trexler
attys.

INVENTOR.
William C. Anderson
BY
Moore, Olson & Trexler
Attys.

INVENTOR.
William C. Anderson
By Moore, Olson & Trexler
Attys.

Dec. 11, 1951 W. C. ANDERSON 2,578,217

SCREW AND WASHER ASSEMBLY MACHINE

Filed Aug. 15, 1947 8 Sheets-Sheet 6

INVENTOR.

William C. Anderson

BY

Moore, Olson & Trexler

Attys.

Dec. 11, 1951 W. C. ANDERSON 2,578,217

SCREW AND WASHER ASSEMBLY MACHINE

Filed Aug. 15, 1947 8 Sheets-Sheet 7

INVENTOR.
William C. Anderson
BY
Moore, Olson & Trexler
Attys.

Dec. 11, 1951 W. C. ANDERSON 2,578,217

SCREW AND WASHER ASSEMBLY MACHINE

Filed Aug. 15, 1947 8 Sheets-Sheet 8

INVENTOR.
William C. Anderson
BY
Moore, Olson & Trexler
attys.

Patented Dec. 11, 1951

2,578,217

UNITED STATES PATENT OFFICE 2,578,217

SCREW AND WASHER ASSEMBLY MACHINE

William C. Anderson, Oak Park, Ill., assignor to Illinois Tool Works, Chicago, Ill., a corporation of Illinois Application August 15, 1947, Serial No. 768,814

19 Claims. (Cl. 10—155)

This invention relates to a screw and washer assembly machine for manufacturing assembled units of screws and washers, and more particularly to a mechanism or machine which may be readily attached to or associated with any standard screw working machine for converting said standard machine into a machine for manufacturing combined screw and washer units.

It is an object of this invention to provide a mechanism or machine for feeding very small split-ring washers, on the order of one-tenth of an inch internal diameter, or smaller, to an assembly station or location and there assembling such washers with screw elements or blanks and then feeding the assembled units from said station or location, preferably to a screw feed mechanism or chute of a screw rolling machine for forming on the screw element or blank beneath the washer a thread or protuberance by which the washer is held in permanently assembled relation with the screw.

A further object of the invention is to provide simple, relatively inexpensive feeding means for delivering very small split-ring washers from a mass in a hopper to a predetermined point or location for discharge or extraction of the washer from the feeding means.

The difficulty in the automatic feeding of very small split-ring washers, on the order of one-tenth of ar. inch in internal diameter or smaller, is due to the size of the washers and their tendency to interlock or form clusters which jam the mechanism or result in the feeding of a cluster rather than an individual washer to the delivery point. Prior washer feeding mechanisms, although in general satisfactory for individually feeding washers of the larger sizes, are entirely unsatisfactory and in many instances completely inoperable for the individual feeding of such small washers. It is accordingly a specific object of this invention to provide means for automatically feeding very small washers from a mass by a spear or similar instrumentality moving through the mass to pick up a washer or cluster of washers in combination with means for firmly securing the individual washer to the spear while breaking the other washers of the cluster from the selected washer, ejecting surplus washers from the spear and thereafter extracting the selected individual washer from the spear at the desired point of delivery.

A still further object of the invention is to provide washer extracting and transfer means cooperating with the spear to remove the selected individual washer from the spear; position it for assembly with a screw element or blank; hold it in position during the assembly operation, and transfer it to means for feeding the assembled units from the assembly point.

A still further object of the invention is to provide suitable means for deflecting excess washers ejected from the spear during its operation back into the washer hopper.

A still further object of the invention is to provide in a machine of the character stated automatic means capable of detecting the presence or absence of a very small washer on the order of one-tenth of an inch internal diameter or less, at an assembly location, and capable of preventing feeding of a screw in the absence of a washer at that location.

Other and further objects and advantages of the invention will be apparent from the following description when taken in connection with the accompanying drawings wherein.

Figure 1:
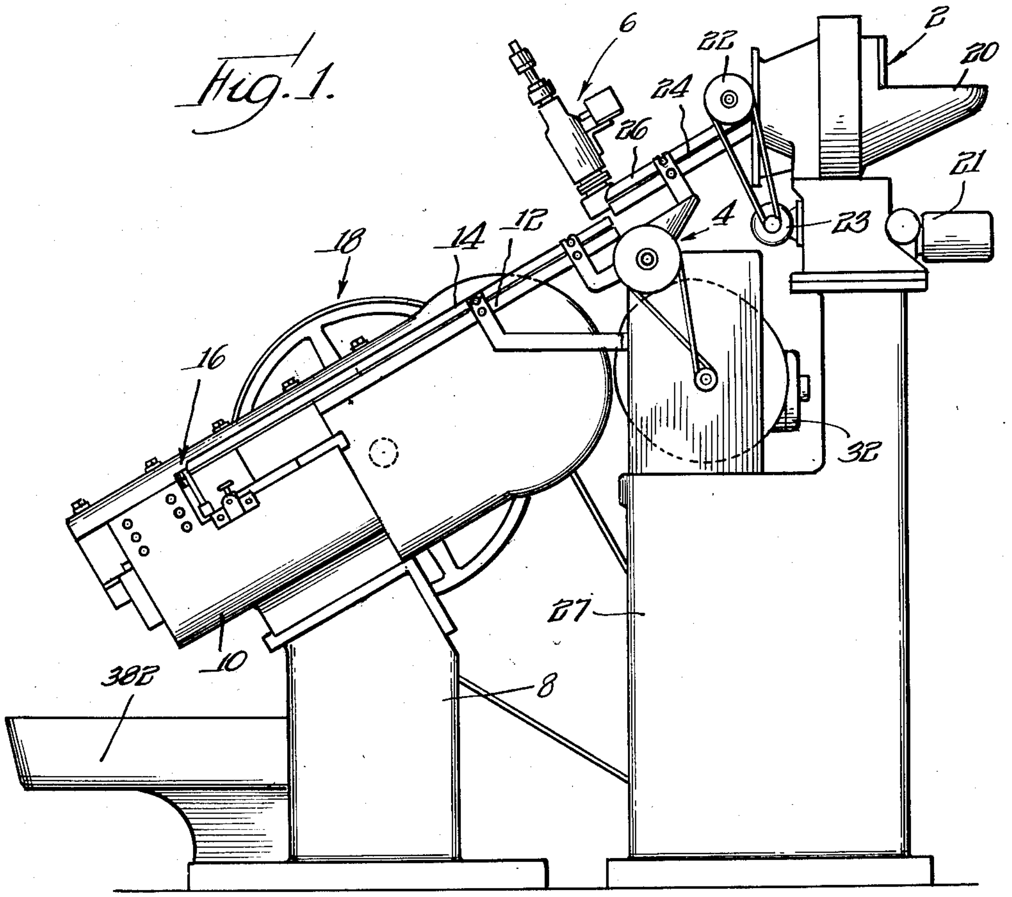
Fig. 1 is a view in vertical elevation of a machine embodying the invention.

As shown in Fig. 1 of the drawing, a machine which forms one embodiment of the present invention comprises a screw thread rolling machine of standard type, such as shown in Wilcox Patents No. 1,584,263 of May 11, 1926, and No. 1,798,919 of March 31, 1931, from which is removed the washer feeding hopper and for which is provided self-contained, self-powered attachments by which said machine may be adapted for the production of permanently assembled screw and washer units. These attachments preferably comprise a screw feeding hopper 2, such as shown in applicant's co-pending application Serial No. 668,888, filed May 10, 1946, now U. S. Patent No. 2,531,099, issued November 21, 1950, and a unitary washer feed mechanism 4 and assembly mechanism 6.

The screw thread rolling machine comprises a main base or pedestal 8, an auxiliary base or body 10 secured to the base 8 and inclined at an angle approximately 30 degrees to the horizontal; an inclined guide chute 12, provided with a covering bar 14 for delivering assembled screw and washer elements to a transfer mechanism 16 by which the assembled elements are carried to a stationary thread rolling die, not shown, which cooperates with a reciprocating die, not shown, to form on the shank of the screw blank beneath the assembled washer a thread which projects beyond the original surface of the shank permanently to hold the washer on the screw; and a drive mechanism 18 for operating the reciprocating die and the transfer mechanism 16.

The screw feeding hopper may be of any conventional structure, but is preferably constructed as shown in said co-pending application Serial No. 668,888. It comprises in general a hopper 20 containing a rotary feeding drum, not shown, driven by a motor 21 and delivering screws from a mass in the hopper 20, past a clearing wheel 22 driven by a motor 23, to an inclined pair of spaced bars forming a guide chute 24 provided with the usual covering bar 26.

The screw feeding hopper 2 and the unitary washer feed mechanism 4 and assembly mechanism 6 may be mounted on a suitable support or supports 27 constructed and positioned in such manner that the washer feed and assembly unit deliver a washer to a position lying in the plane of the upper edge of the guide chute 12; receive a screw blank from the lower end of the screw feeding chute 24; carry the screw blank downwardly and insert it into a washer and then deliver or release the assembled unit for movement by gravity down the chute 12.

Figure 3:
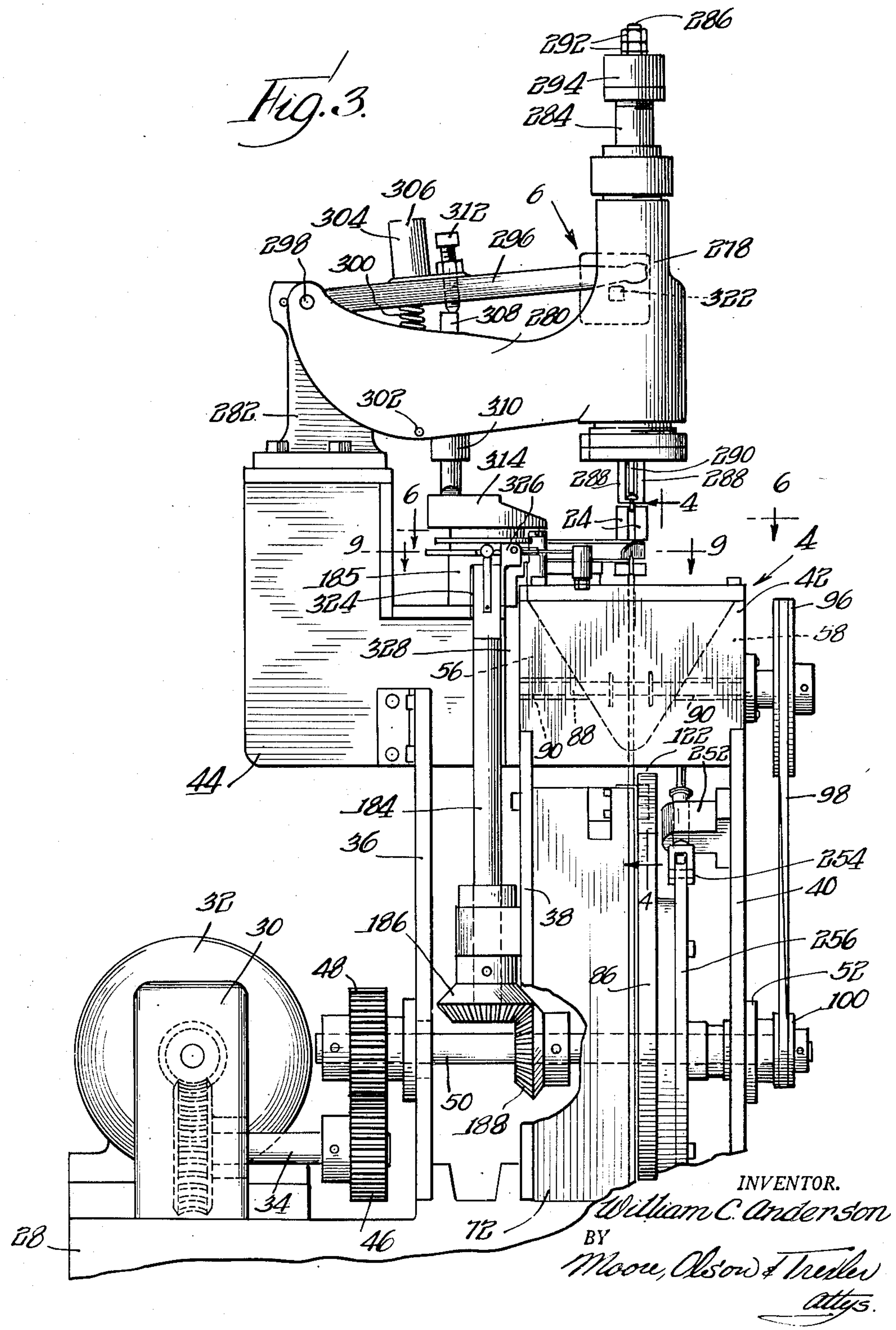
Fig. 3 is a front view in elevation of the unit of Fig. 2.

As shown best in Fig. 3, the washer feed mechanism 4 and the assembly mechanism 6 are combined as a unit on a common base plate 28 which may be secured in any desired manner to the support 27. This base plate 28 supports a variable speed transmission unit 30 powered by an electric motor 32 and driving, at a preselected speed, a shaft 34 journaled in and projecting from the housing of the transmission unit 30. The base plate 28 also supports upstanding spaced plates 36, 38, and 40.

The plates 36, 38, and 40 are attached to and support at their upper ends a hopper casting 42 and a supporting casting 44 for the assembly mechanism 6.

Shaft 34 carries at its outer end a gear 46 intermeshing with a gear 48 on one end of a drive shaft 50 journaled in suitable bearings 52 mounted on the plates 36 and 40.

Figures 4, 5:
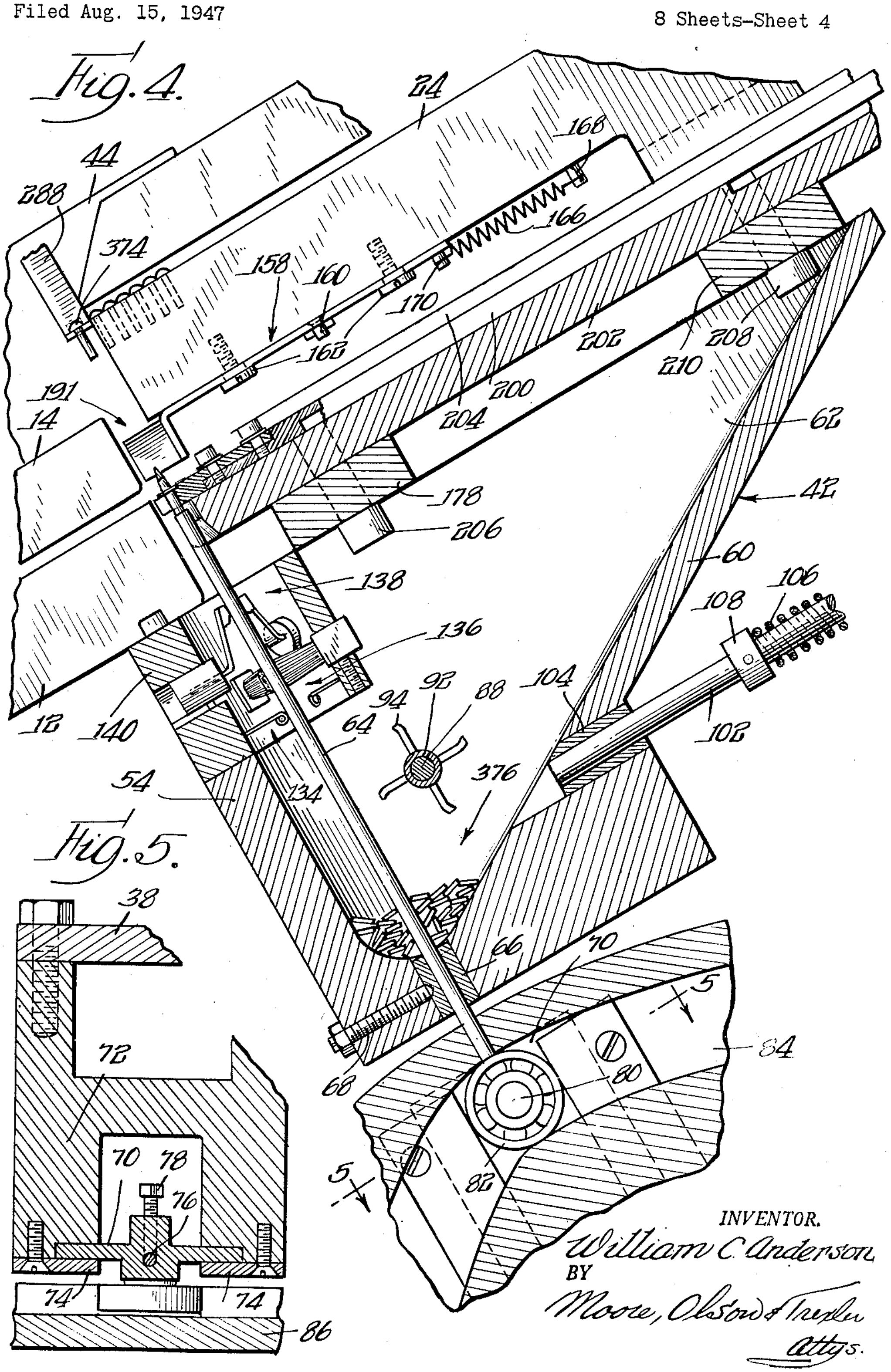
Fig. 4 is a fragmentary view in vertical section taken through the line 4—4 of Fig. 3.
Fig. 5 is a fragmentary view in substantially horizontal section taken along the line 5—5 of Fig. 4.
Figures 6, 7, 8:
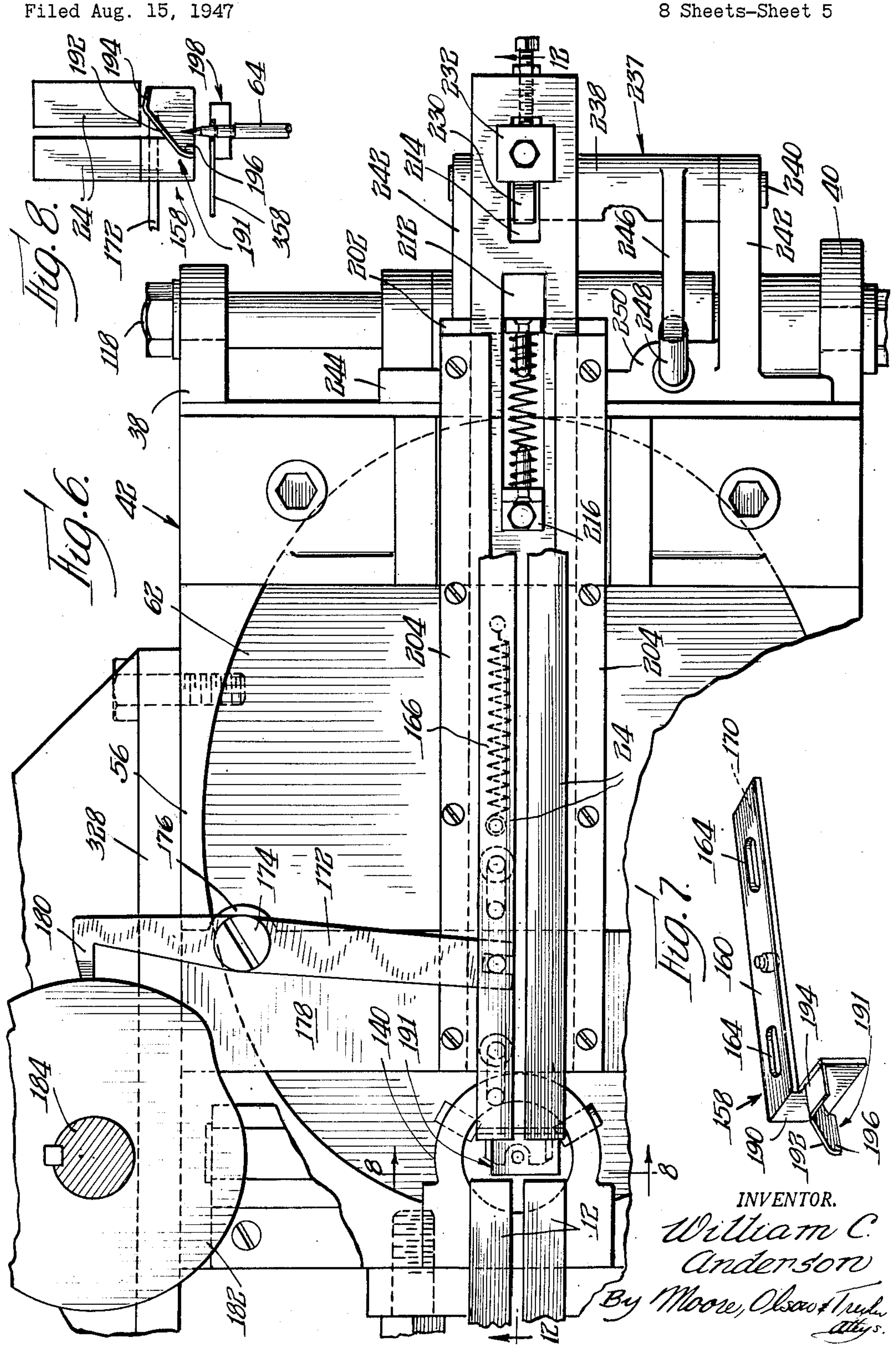
Fig. 6 is a fragmentary view in substantially horizontal section taken along the line 6—6 of Fig. 3.
Fig. 7 is a view in perspective of a washer deflector forming part of the unit shown in Figs. 2 and 6.
Fig. 8 is a fragmentary view in substantially vertical section taken along the line 8—8 of Fig. 6.

The hopper casting 42 consists of a front wall 54 (Fig. 4), sidewalls 56 and 58 (Fig. 3), and an inclined bottom wall 60 (Fig. 4), all of which form a trough 62 generally V-shaped in longitudinal section and in cross section as seen in Figs. 3 and 4 and substantially elliptical in plan view as seen in Fig. 6. Washers dumped into the hopper move by gravity down the inclined bottom wall 60 of the hopper to collect in a mass at the lowest point of the hopper adjacent the front wall 54.

A spear or rod 64 is slidably mounted in a bushing 66 set into an aperture in the bottom of the hopper at its lowest point and held in position by a set screw 68. The spear 64 extends below the hopper and is secured to a slide block 70 mounted in a block or casting 72 (Figs. 3 and 5) to one side of which are secured guide bars 74 overlying the slide block 70. The block or casting 72 is bolted at its other side to the plate 38.

It is to be noted that the hopper 42 is so mounted on the plates 38 and 40 that its upper surface extends parallel to the inclined screw feeding guide chute 44 and the guide chute 12, which are parallelly disposed but spaced vertically at their adjacent ends. The spear 64 and the slide block 70 to which it is attached are so mounted as to move at right angles to the upper surface of the hopper and the guide chutes 12 and 24.

The slide block 70 is formed with a longitudinal aperture 76 receiving the lower end of the spear and the spear is adjustably fixed thereto by a set screw 78.

A pin 80 carried by the slide 70 has journaled on it a roller bearing 82 which forms a cam roller or follower received in an internal cam slot 84 of a driving cam 86 keyed to the driving shaft 50.

A shaft 88 (Figs. 2 to 4) extends through the trough 62 of the hopper and is journaled in suitable bushings 90 in the sidewalls 56 and 58 adjacent the spear 64, as best seen in Fig. 3. A plurality of disks 92 having radial prongs 94 are mounted on the shaft 88 within the trough. These pronged disks, which are rotated in a clockwise direction, as seen in Fig. 4, serve to agitate the washers in the mass about the spear so that the spear may move through the mass and pick up washers on each upward movement.

The shaft 88 extends from the hopper and carries at its outer end a pulley 96 connected by a belt 98 to a drive pulley 100 fastened to the outer end of driving shaft 50.

A washer agitating plunger 102 (Fig. 4) is slidably mounted in a bushing 104 in the bottom wall of the hopper for movement substantially at right angles to the spear to insure positioning of the washers in the path of the spear. Rod 102 is projected into the hopper toward the spear by a spring 106 encircling the rod and bearing at one end against a collar 108 fixed to the rod and at the other end against a depending arm 110 (Fig. 2) of a bracket 112 bolted to the bottom wall 60 of the hopper. The rod projects through an opening in the arm 110 and through an enlarged opening in the outer end of the arm 114 of a bell crank 116 pivoted by pin 118 to the plate 40. The other arm 120 of the bell crank 116 carries a cam roller 122 which engages the peripheral cam surface 124 of the cam 86. The cam 86 acting through the bell crank 116 serves to retract the washer agitating feed plunger 102. Forward movement of the arm 114, and hence projection of the rod 102, is limited by set screw 126 threaded in a suitable opening in the lower end of the depending arm 110 of the bracket 112 and held in adjusted position as by locking nut 128.

As best shown in Figs. 4, 16, 18, and 19, the upper end of the spear 64 is reduced and at its outer end beveled or formed as a conical tip 130, the angle of which is preferably 30 degrees. The conical tip 130 merges into a frusto-conical section 132, the surface of which is preferably inclined to the longitudinal axis or cylindrical surface of the spear at an angle of substantially 4 degrees so that the washer received on the spear and pressed downwardly of the spear on the surface 132 will frictionally adhere thereto.

As the spear moves upwardly it carries washers picked up by it past a set 134 of primary cluster breakers, a set 136 of secondary cluster breakers, and a set 138 of pressure pads. These cluster breakers and the pressure pads are mounted in an open ended housing 140 set into the forward wall 54 of the hopper casting.

Figures 16, 17:
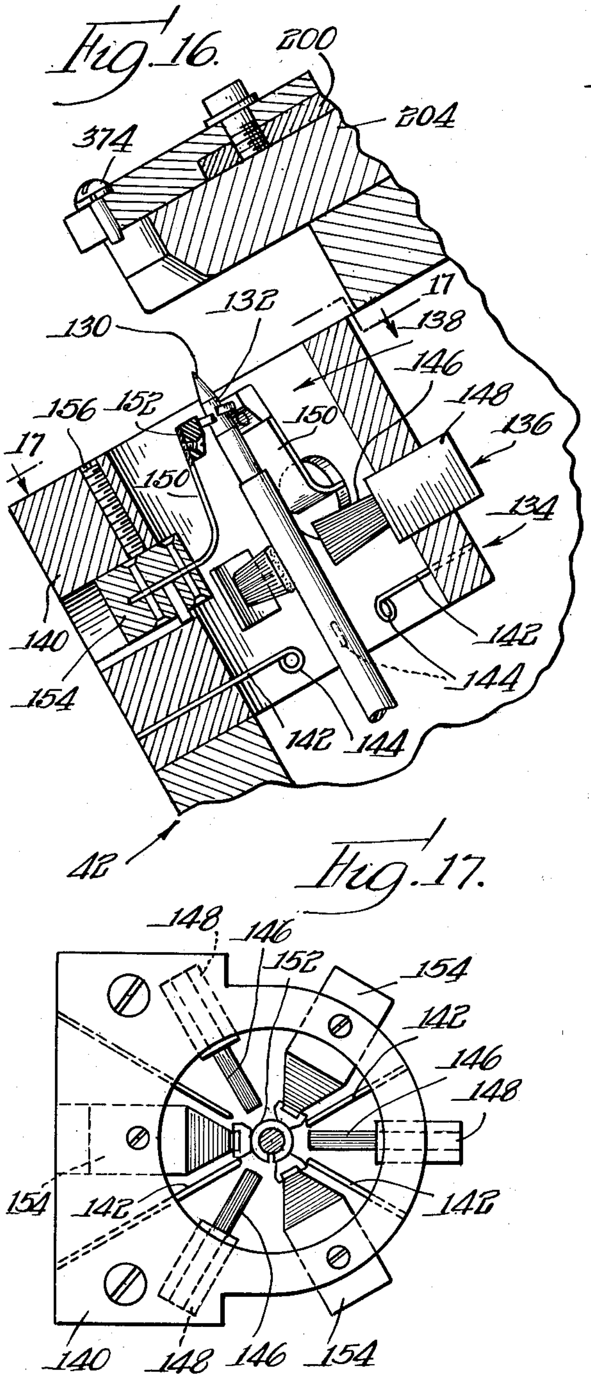
Fig. 16 is an enlarged view of a portion of the mechanism shown in Fig. 4.
Fig. 17 is a view in substantially horizontal section taken along the line 17—17 of Fig. 16.

The primary set 134 of cluster breakers comprises, as best shown in Figs. 16 and 17, four wires 142 received in suitable apertures in the housing and projecting radially therefrom into juxtaposition to the spear. The outer ends of the wires 142 are looped as at 144 so that washers of the clusters which are broken by the wires will not seat themselves on the wires. The second set of washer cluster breakers consists of three angularly spaced brushes 146 mounted in suitable holders 148 press fitted into openings in the walls of the housing 140. These brushes preferably are positioned in closer juxtaposition to the spear than are the wires 142. Preferably they are so spaced from the spear as to engage the external surface of a washer telescoped on the upper end of the spear and therefore, as the spear moves upwardly, apply a downward force in a direction substantially axially of the spear to split-ring washers interlocked with the split-ring washer telescoped on the spear and thereby separate the washers.

Figure 2:
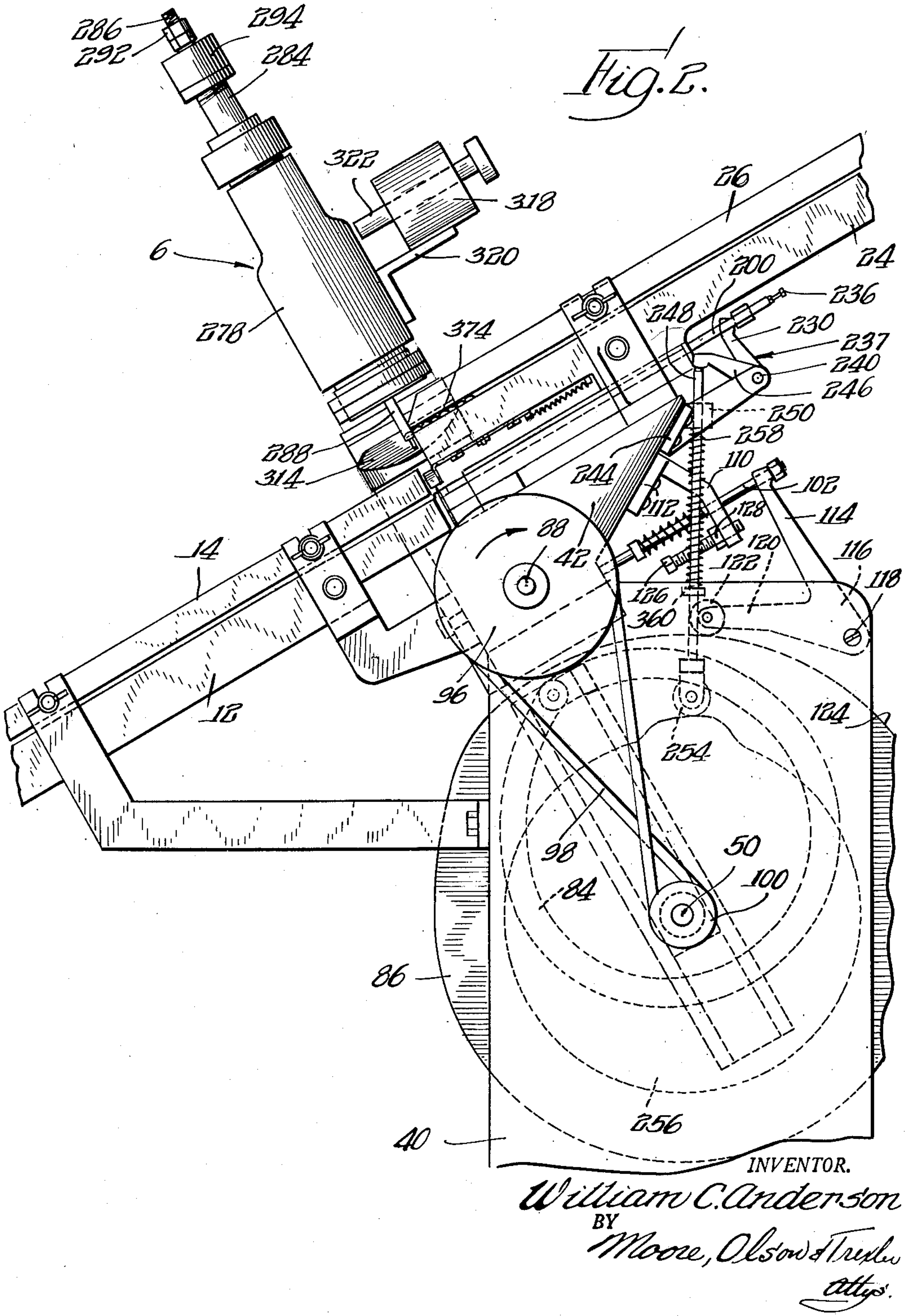
Fig. 2 is a view in side elevation of a washer feeding and assembly unit of the machine of Fig. 1.
Figure 18:
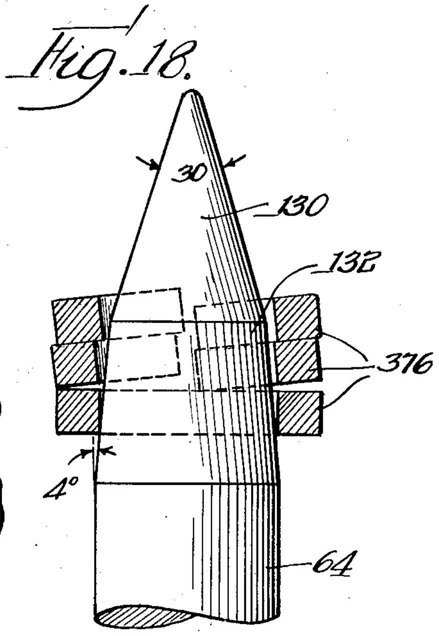
Figs. 18 and 19 are diagrammatic illustrative views showing certain principles of operation of the washer feeding spear which forms part of the unit shown in Figs. 2 and 16.
Figure 19:
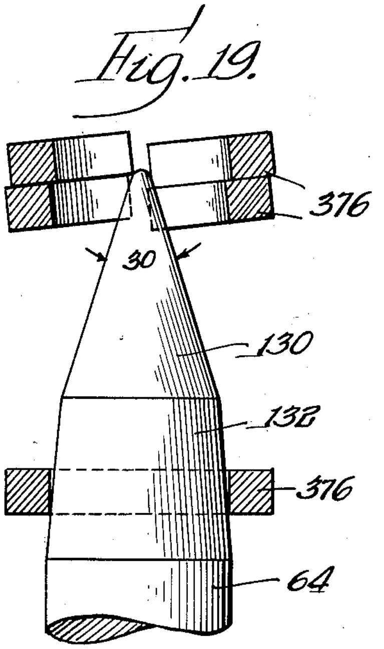

The set of pressure pads 138 preferably comprises angularly spaced resilient metal straps 150 carrying at their upper ends rubber pads or hardened steel blocks 152 urged by the resilient action of the metal straps into engagement with the surface of the spear. The straps 150 are provided with outturned lower end portions clamped in blocks 154 adjustably mounted in radial openings in the walls of the housing 140 and held in adjusted position by set screws 156. The rubber pads or hardened steel blocks 152 engage washers telescoped on the upper end of the spear and by offering resistance to the upward movement of the washers apply a downward pressure thereto to force the lowermost of such telescoped washers into firm contact with the beveled surface 132 of the spear, as shown in Figs. 18 and 19. It should be here noted that the speed of the cam 86 is such, and the internal cam track 84 so shaped, as best seen in Fig. 2, that the spear moves upwardly at a relatively high rate of speed until it very closely approaches its upper limit of movement when it is very suddenly stopped, then held in its uppermost position for a short period of time and thereafter moved downwardly or retracted. This sudden stopping of the spear causes any washers telescoped on the spear but not in firm contacting engagement with the beveled surface 132 to be projected from or fly off the end of the spear so that only one washer remains on the spear when it has reached its uppermost position.

Washer deflecting means 158, Figs. 3, 4, and 6 to 8, is provided to deflect the excess washers thus projected from the spear back into the washer hopper. This washer deflecting means preferably comprises a metal strap or bar 160 slidably mounted by cap screws 162, received in longitudinal slots 164 in the strap, to the under surface of one of the bars forming guide chute 24. The bar 160 is moved rearwardly or retracted by a spring 166 secured at one end to a pin 168 depending from the guide bar and is secured at its other end to a pin 170 carried by and depending from the bar 160. The bar 160 is moved forwardly or projected by a lever 172 journaled on a stud 174 mounted in a boss 176, Fig. 6, formed with or secured to a cross bar or plate 178 bolted to the top of the hopper 42.

The lever 172 is provided with a laterally extending cam engaging and follower finger 180 engageable with a cam 182 keyed to a shaft 184. Shaft 184 is journaled in a suitable bearing, not shown, in a boss 185 (Figs. 3 and 11), supported by the castings or steel plates 44. At its lower end it has secured to it a beveled gear 186 meshing with a beveled gear 188 on the driving shaft 50.

The bar 160 of the washer deflecting means 158 is formed at its forward end with a depending portion 190 (Figs. 7 and 8) which carries a washer deflecting hood 191 comprising a central portion 192 inclined substantially at an angle of 45 degrees, a declining upper portion 194, and a substantially vertical lower portion 196. It will be evident from the showing of Figs. 6 and 8 that when the bar 160 is in its forward position such that the washer deflecting hood extends over the path of the spear 64, the excess washers which are tossed or projected upwardly from the spear when it is suddenly stopped will engage or strike the under surface of the inclined portion 192 of the hood and will be deflected outwardly and downwardly and hence returned outside the path of the spear back into the hopper.

The single washer properly seated on the surface 132 of this spear is extracted from the spear and held in proper position for assembly with the screw blank by a washer extracting and holding means 198, best shown in Figs. 4, 6, 9, and 12 to 15. This mechanism preferably comprises a slide bar 200 slidably mounted on a bar 202 between upstanding flanges of the bar and held therein by guide bars 204 bolted to the bar 202 and overhanging the slide bar 200.

The guide bar 202 is secured as by bolts 206 and 208 to the cross bar or plate 178 and a like cross bar or plate 210 also secured to the top of the hopper 42.

The slide bar 200 is provided with a first slot 212 (Fig. 6) and a second, narrower and shorter slot 214 disposed rearwardly of the first slot.

The first slot 212 receives at its forward end an angle piece or block 216 which is bolted to the slide bar and at its lower end projects into a guide slot 218 (Fig. 12) in the guide bar 202. The block 216 also carries a centering pin 220 for one end of a slide bar operating spring 222 mounted in the slot 212. The interfitting of the projection of the block 216 with the guide slot 218 prevents the spring 222 from exerting lateral forces on the slide bar such as would cause the slide bar to bind in the guide bar 202.

A plate 224 bolted to the rear or upper end of the guide bar 202 is formed with a central upwardly projecting lug or portion 226 received in the slot 212 and carries a centering pin 228 for the rear end of the operating spring 222.

The free end of an actuating lever 230 projects into the second slot 214 and engages an adjustable stop 232 which comprises a block substantially T-shaped in cross section. The reduced portion on the block is interfitted with the slot 214 and the block is clamped to the slide bar by a cross plate 234 bolted to the under surface of the block 232. The block is adjustably positioned by a set screw 236 threaded in a suitable opening in the rear end of the slide bar and bears against the rear edge of the block 232. The lever 230 for actuating slide bar 200 is one arm of a bell crank 237 (Figs. 2 and 6) having an extended hub 238 journaled on a pin 240 secured to rearwardly extending arms 242 of a bracket 244 bolted to the bottom wall of the hopper adjacent the upper end thereof, as is best seen in Fig. 2. The other arm 246 of this bell crank extends forwardly for operating engagement with a plunger 248 slidably mounted in a block 250 formed integrally with the bracket 244 and a block 252, Fig. 3, secured to the supporting plate 40. The plunger carries at its lower end a cam roller 254 which engages with an actuating cam 256 secured to the driving shaft 50. The cam 256 raises the plunger rod to swing the lever arms 246 and 230 in a clockwise direction, as seen in Fig. 2, to move the slide bar 200 upwardly and to the right or retract the same. The cam 256 permits the plunger 248 to be lowered by a spring 258 which encircles the plunger 248 and is confined between the block 250 and a collar pinned to the plunger. Thus the spring 258 urges the plunger 248 downwardly to maintain the cam roller 254 in engagement with the actuating cam 256.

The slide bar 200 has detachably secured to its lower front end, as best seen in Figs. 9, 10, and 12 to 15, a washer holding plate 262 secured to the bar as by screws or bolts 264. The plate 262 extends in advance of the slide bar 200 and is formed at its forward end with a slot or notch 266 to receive the upper end of the washer feeding spear and that notch is circumscribed by a recess or groove 268 which forms a seat for the washer and a means for supporting the washer during the insertion of a screw blank thereinto and through the slot or notch 266 in the washer holding plate. The washer holding plate 262 is also formed at its forward end with an undercut or recessed surface 270 substantially co-planar with the base of the recess or groove 268 to permit projection of a washer detector hereinafter described into the washer-receiving groove and into engagement with the washer if the same is received in said groove.

The guide bar 202 is formed at its front end with a slot or notch extending perpendicular to the guide bar and co-axial with the slot 266 and the groove 268 in the forward end of the slide bar. The semi-circular notch in the forward end of the guide bar is formed with an upper cylindrical portion 272 (Fig. 15) and a lower frusto-conical portion 274, the surface of which tapers outwardly and downwardly. The wall of this notch forms a positioning guide for the upper end of the washer feeding spear, and also, as will presently appear, a positioning guide for the shank of the screw blank when the same is inserted in a washer seated in the groove 268.

The spring 222 is permitted by the cam 256 to move the slide bar 200 forwardly in timed relation with the upward movement of the spear, but the spear having reached its upper limit of movement, the slide bar thereafter reaches its forward limit of movement in which the wall of the notch 266 encircles the spear below the beveled portion 132 of the tip of the spear so that the washer on the tip of the spear rests above the plane of the washer holding plate 262. As the spear is thereafter moved downwardly or retracted, a washer is deposited in the groove 268 of that plate and thereby extracted from the spear as it continues its downward movement.

The slide bar 200 remains in its forward position for a sufficient length of time to permit a screw blank to be telescoped therewith and thereafter it is withdrawn by the upward movement of the actuating plunger 248 under control of the cam 256.

The assembly mechanism 6 may be of any suitable structure but is preferably constructed, as shown in Poupitch Patent 2,343,798 of March 7, 1944. It comprises in general a body casting 278 (Figs. 2 and 3) having integral spaced arms 280, of which one only is shown in the drawing, secured to a bracket 282 bolted to the supporting casting or steel frame 44. A tube 284 is slidably mounted in the body casting 278 shown in the Poupitch patent, and a rod 286 is slidably mounted in the tube 284. The tube 284 carries at its lower end a pair of shiftably mounted jaw members 288, and the rod 286 carries at its lower end a plunger 290 which engages and clamps the head of the screw blank held in the jaw members. The rod 286 carries at its upper end adjusting and clamping nuts 292 which when the rod is in its upper position are spaced slightly from the cap nut 294 on the upper end of the tube 284. The rod 286 is operated as shown in said Poupitch patent by a lever 296 pivoted as at 298 to the bracket 282. The lever 296 is moved downwardly by a tension spring 300 which is secured at its lower end to pin 302 secured to one of the arms 280 of the casting 278. The spring projects through an opening in the lever 296 and through a thimble 304 secured to the upper side of the lever. At its upper end the spring is secured to a cross pin 306 seated in notches at the upper end of the thimble 304.

The lever 296 is moved upwardly by a rod 308 slidably mounted in a suitable guide 310 secured to or formed integrally with the costing 278. The rod 308 abuts a set screw 312 threaded in a suitable opening in the lever 296. The rod 310 is raised and permitted to lower under the action of the spring 300 by a cam 314. The cam 314 is fastened to the upper end of the shaft 184. As the lever 296 swings upwardly and downwardly, it moves the rods 286 and 284 and the plunger 290 upwardly and downwardly and by suitable mechanism contained within the casting 278, as shown in Fig. 26 of the Poupitch patent, the jaw members 288 are caused to open and close as the rods approach their limits of movement. A solenoid 318, mounted on a bracket 320 secured to the casting 278, is provided with a plunger 322 which projects through an opening in the casting and engages the end of the lever arm 296 to prevent its downward movement when no washer is positioned at the assembly station or in the groove 268 of the washer holding plate 262. This solenoid is controlled by a micro-switch 324 (Figs. 3, 9 and 11) secured to a bracket 326. The bracket 326 is secured to a vertical flange of the supporting casting or plate 44. The operating leaf spring 330 of the micro-switch 324 extends upwardly therefrom between the arms of a yoke 332 (Figs. 9 and 11) mounted on the free end of arm 334 of a bell crank 335 journaled on a pin or bolt 336 mounted in the boss 338 of a bracket 340 bolted as at 342 to the top of the hopper 42.

Figures 9, 10, 11:
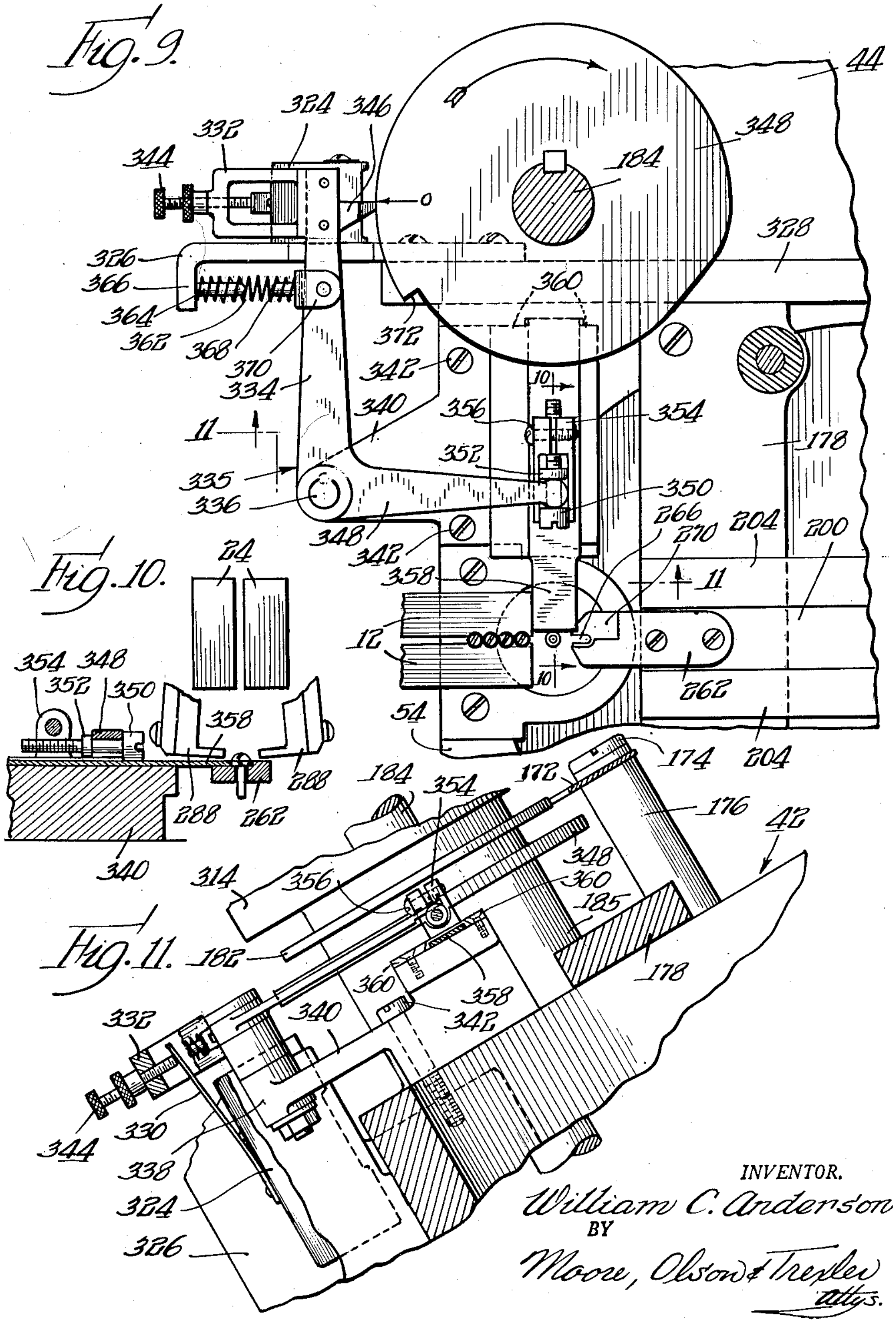
Fig. 9 is a fragmentary view in substantially horizontal section taken along the line 9—9 of Fig. 3.
Fig. 10 is a fragmentary view in substantially vertical section taken along the line 10—10 of Fig. 9.
Fig. 11 is a fragmentary view in vertical section taken along the line 11—11 of Fig. 9.

A set screw 344 carried by the yoke 332 serves as an adjustable abutment engaging and actuating the operating spring 330 of the micro-switch when the yoke moves to the right in Fig. 9. The yoke is also formed with a projection 346 which engages a cam 348 keyed to the shaft 184. The other arm 348 of the bell crank 335 is formed with a knuckle received between the head of a set screw 350 and a collar 352 threaded on or formed integrally with the set screw. The set screw is threaded into an upstanding, split boss 354 so that it may be adjusted axially but clamped into position with respect to the boss by a bolt 356 clamping the split parts of the boss against the set screw. The boss 354 is formed on or secured to a relatively thin plate or strap 358 slidably mounted between guide bars 360 bolted to the base of the bracket 340. The plate or strap 358 forms a washer detector plate movable perpendicularly to the washer holding plate 262 and aligned with the recess 270 and the groove 268 of the plate 262. The bell crank 335 is urged in a clockwise direction; the washer detector plate 358 urged outwardly, and the projection 346 urged into engagement with cam 348 by coil spring 362 mounted at one end on a pin 364 secured to an inwardly turned end 366 of the bracket 326 and a like pin 368 secured to a bracket 370 fastened to the arm 334 of the bell crank.

The set screw 350 provides means for adjusting the position of the washer detector plate 358 with respect to the washer holding plate 262, but the distance which the detector plate moves is fixed and not varied by adjustment of the set screw. Normally, the cam 348 holds the washer detecting plate 358 in retracted position. When the washer has been deposited in groove 268 of the washer holding plate 262, the sharp shoulder 372 of the cam permits the spring 362 to swing the bell crank 335 in a clockwise direction, thereby moving the washer detector plate into engagement with the washer in the groove. The washer in the groove limits the movement of the washer detector plate and the angle of rotation of the bell crank so that when a washer is thus positioned the projection 346 will not move inwardly the full distance permitted by the depth of the shoulder 372. However, if no washer is positioned in the groove 268 of the washer holding plate, then the detector plate may move outwardly a further distance permitted either by the full depth of the shoulder 372 of the cam or the wall of the washer receiving groove 268. The set screw 344 is so adjusted that on such additional movement of the washer feed plate it moves the operating spring 330 of the micro-switch sufficiently to the right, as seen in Figs. 9 and 11, to close the contacts of the micro-switch and through the micro-switch energize the solenoid 318 so that its plunger 322 is projected thereby into the path of the operating lever 296 of assembly mechanism 6 and thereby prevents feeding of a screw blank from the screw feed chute 24. It will be evident that the washer detecting plate 358 serves also, by reason of its engagement with a washer when in the groove 268 to correct any misalignment of the washer with respect to the path of the shank of the screw blank. The set screw 350 is precisely adjusted to insure that the exact alignment of the washer with the shank of the screw blank is obtained.

Figure 20:
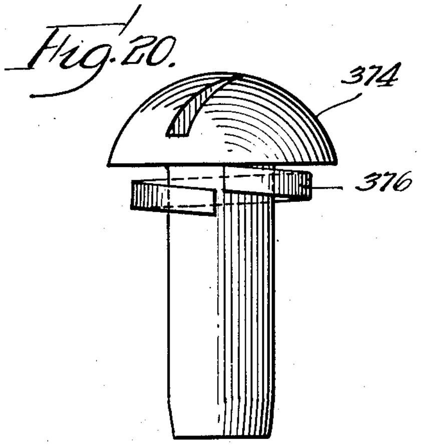
Fig. 20 is an enlarged view in vertical elevation of a screw blank and split-ring washer assembly prior to the rolling of threads on the blank.
Figure 21:
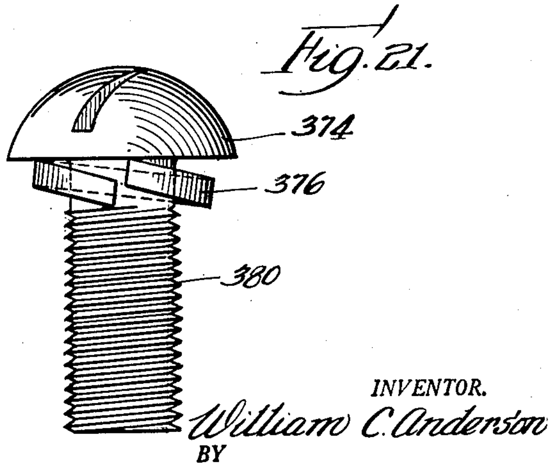
Fig. 21 is a vertical elevation similar to Fig. 20 but with the threads rolled on the blank.

The operation of the machine will be apparent from the description heretofore given of the construction and operation of the several mechanisms. It suffices, therefore, to set forth briefly the cooperative functioning of these several mechanisms. A screw blank 374 (Fig. 20) having a shank diameter slightly smaller than the internal diameter of the split-ring washer with which it is to be assembled is fed from a mass in the hopper 20 to the inclined feed chute 24. The foremost screw blank in the chute slides into the jaw members 288 when the rods 286, 284 and plunger 290 are in their uppermost positions.

Split-ring washers 376 on the order of one-tenth of an inch in internal diameter or smaller are dropped en masse into the hopper 42 and gravitate down the bottom wall 60 of the hopper to almost the end thereof and collect in a mass or group positioned about and in the path of the spear 64. The washers in this mass are agitated, to prevent them from becoming hopelessly entangled and to maintain them in a fluent state, by the pronged rotating disk 92 and the reciprocatory rod 102.

As the spear 64 moves upwardly through the mass at the lower end of the hopper, it at some time during its passage and before it reaches the primary cluster breaking wires 142, telescopes into or with one of the split-ring washers with which others may be entangled or clustered. Several such washers may be picked up by the spear and be telescoped therewith. As the spear moves further upwardly, the washers which are entangled with washers telescoped on the end of the spear are first engaged by the wires 142 and then by the brushes 146. These springs and brushes break these clusters of entangling washers from the washers telescoped on the spear and these excess washers fall back into the group or mass at the bottom of the hopper.

The remaining split-ring washers telescoped on the end of the spear are next carried, as the spear moves further upwardly, between the pressure pads 152 which serve to apply a retarding, and hence downward pressing, force upon the washers and force the lowermost washer into tight-fitting frictional engagement with the frusto-conical beveled surface 132 of the tip of the spear.

As the washer-carrying tip of the spear passes the pressure pads, the spear moves quite rapidly almost to the end of its upper limit of movement and is then stopped very abruptly. This abrupt stopping of the spear serves to project any washers which lie above the single washer that is in binding frictional engagement with the surface 132 of the end of the spear, as shown in Fig. 19, so that they fall back into the hopper through the box 140, or, more generally, over the side of this box and into the hopper. Suitable guide plates, not shown, are provided for this.

Before the spear reaches its upper limit of movement the plate 160 carrying the washer deflecting hood 191 is brought forward by the action of cam 182 on lever 172, acting against the tension of spring 166, and any washers thereafter projected from the end of the spear by the sudden stopping thereof engage the washer deflector surfaces 192, 194, and 196, and are directed downwardly and returned to the hopper.

Just before the spear starts to move downwardly the slide bar 200 is moved forwardly by its operating spring 222 so that the single washer now left on the end of the spear is seated in the groove 268 of the washer holding plate 262. The washer detector plate 358 is then moved outwardly to engage the split-ring washer seated in the groove 268. If no washer is in the groove the operating spring 330 of the micro-switch 324 is sufficiently depressed to close the switch and thereby actuate the solenoid 318. The solenoid then locks the assembly unit against downward feeding of the screw.

A split-ring washer 376, Fig. 19, being properly positioned in the washer holding plate, the cam 314 now permits the spring 300 to actuate the lever 296 to lower the rod 286, the tube 284, the plunger 290 and the jaw members 288 thereby to feed a screw blank 374 downwardly and telescope the shank thereof with the split-ring washer 376. The jaw members 288 then move outwardly to release the screw, the plunger 290 moves slightly downward to push the head of the screw against the upper surface of the washer, and the cam 314 moves the plunger 308 upwardly to raise the jaw members and the plunger 290.

Figures 12, 13, 14, 15:
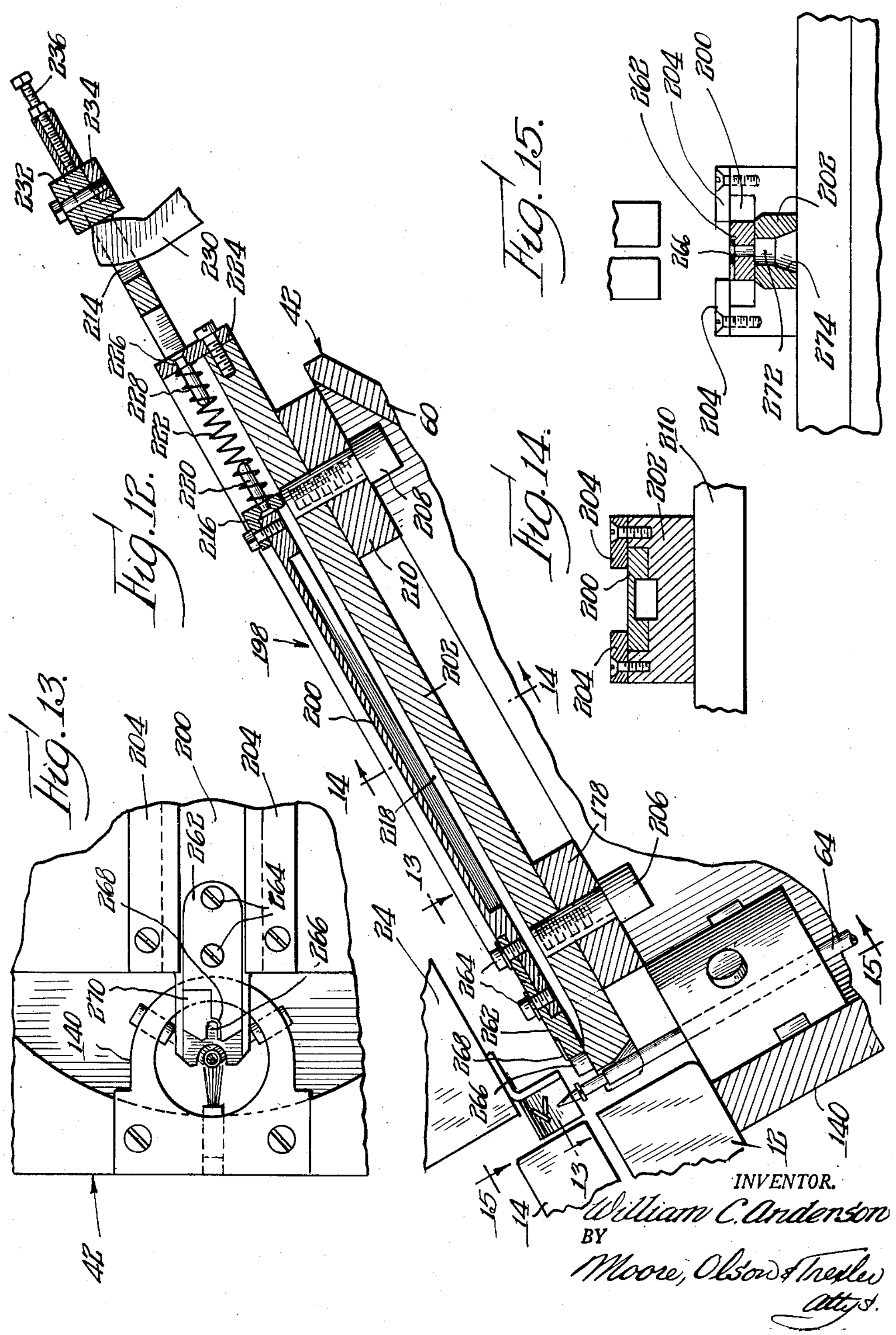
Fig. 12 is a fragmentary view in vertical section taken along the line 12—12 of Fig. 6.
Fig. 13 is a fragmentary view in substantially horizontal section taken along the line 13—13 of Fig. 12.
Fig. 14 is a fragmentary view in substantially vertical section taken along the line 14—14 of Fig. 12.
Fig. 15 is a fragmentary view in substantially vertical section taken along the line 15—15 of Fig. 12.

As soon as the jaw members and the plunger 290 move outwardly and upwardly sufficiently to clear the path of the head of the screw, the assembled screw and washer unit slides from the washer holding plate 262 onto the screw feeding chute 12 for, as clearly shown in Fig. 4, the base surface of the groove 268 in which the washer is received is in alignment with the upper edge of the chute 12 and, as seen in Fig. 12, when the slide bar 200 is in its forward position, the forward end of the washer holding plate is in very close juxtaposition to the rear end of the feed chute 12.

The assembled units now gravitate along chute 12 to the bottom end thereof where they are received one by one in the transfer mechanism 16 and are carried transversely from the chute, as disclosed in Hanneman Patent 2,152,591, to a reciprocating thread rolling die by which they are rolled across a stationary die to form on the shank of the screw blank beneath the assembled washer a thread 380 the crest of which by the rolling process is extruded from the shank of the screw blank and thereby serves to hold the split-ring washer in permanently assembled relation on the screw. The assembled and threaded units then fall from the end of the thread roller into the usual receiving pan 382.

It will be evident from the foregoing description that applicant has provided a mechanism or machine for feeding and assembling very small split-ring washers, on the order of one-tenth of an inch internal diameter, or smaller; a simple, relatively inexpensive feeding means for delivering very small split-ring washers from a mass in a hopper to a predetermined point or location for discharge or extraction of the washer from the feeding means; a washer extracting and transfer means cooperating with a washer feeding spear to remove the washer from the spear, position it for assembly with a screw element or blank, hold it in position during the assembly operation, and transfer it to means for feeding the assembled units from the assembly point; and in a machine of the character stated automatic means capable of detecting the presence or absence of a very small washer on the order of one-tenth of an inch internal diameter or less, at an assembly location, and capable of preventing feeding of a screw in the absence of a washer at that location.

Obviously the invention is not limited to the specific details of construction disclosed herein but is capable of other modifications and changes without departing from the spirit and scope of the appended claims.

What I claim is:

1. In a machine for assembling fastener elements with washers, an assembly mechanism, means for feeding fastener elements in succession to said assembly mechanism, a washer hopper, washer feeding means comprising a spear movable longitudinally upward through a disorderly mass of washers in the hopper, means on said spear to impale a washer thereon during upward movement of the spear and deliver the washer to an assembly station, means at said station for extracting a washer from said spear, said extracting means and said assembly mechanism being mounted for relative movement toward and from each other to telescope a fastener element fed to said mechanism with a washer extracted by said extracting means from said spear.

2. In a machine for assembling screw elements with washers, an assembly mechanism, means for feeding screw elements in succession to said assembly mechanism, a washer hopper, a washer feeding spear mounted for reciprocation upward through and beyond a disorderly mass of washers in said hopper, means on said spear to impale a washer thereon during upward movement of said spear, a washer holder shiftable transversely of the path of movement of said spear beyond the mass of washers in the hopper, means for reciprocating said spear and shifting said washer holder in timed relation whereby the washer holder engages a washer on the spear and extracts it therefrom as the spear is reciprocated, said assembly mechanism including means for telescoping a screw element fed thereto into a washer held by said washer holder.

3. In a machine for assembling screw elements with washers, an assembly mechanism, means for feeding screw elements to said assembly mechanism, a washer hopper, a spear mounted for reciprocation through and beyond a disorderly mass of washers in the hopper to impale a washer thereon as it passes through the mass and deliver the impaled washer to an assembly station, a washer holding plate mounted for reciprocation transverse to the path of reciprocation of the spear and toward and from the spear, said washer holding plate having a fixed opening therein to receive and encompass the spear as the spear and plate relatively approach each other and a fixed surface adjacent the opening to support the washer impaled thereon whereby to extract the washer from the spear as the spear and plate relatively recede from each other, said assembly mechanism including means for telescoping a screw element fed thereto into a washer held on said plate.

4. In a machine for assembling screw elements with washers, an assembly mechanism, means for feeding screw elements in succession to said assembly mechanism, a washer hopper, washer feeding means comprising a spear movable longitudinally upward through a disorderly mass of washers in the hopper, means on said spear to impale a stack of washers thereon during upward movement of the spear and deliver the lowermost one of the stack to an assembly station, means for suddenly changing the speed of the spear in its upward movement toward the assembly station to eject all but the lowermost one of the stack of washers from the spear, and means for deflecting the ejected washers from the spear back into the hopper, means at said assembly station for extracting the remaining washer from said spear, said extracting means and said assembly mechanism being relatively movable to telescope a screw element fed to said mechanism with a washer extracted by said extracting means from said spear.

5. In a machine for assembling screw elements with washers, an assembly mechanism, means for feeding screw elements to said assembly mechanism, a washer hopper, a spear mounted for reciprocation through and beyond a disorderly mass of washers in the hopper to impale a washer thereon as it passes through the mass and deliver the impaled washer to an assembly station, a washer holding plate mounted for reciprocation transverse to the path of reciprocation of the spear, said washer holding plate having a fixed opening therein to receive and the plate to encompass the spear as the spear and plate relatively approach each other and support the washer impaled on the spear whereby to extract the washer from the spear as the spear and plate relatively recede from each other, said assembly mechanism including means for telescoping a screw element fed thereto into a washer held on said plate, and a washer detector operable in timed relation to said telescoping means and means controlled by said washer detector for rendering said telescoping means ineffective in the absence of a washer on said plate.

6. In a washer feeding device, a washer hopper receiving a disorderly mass of washers, a spear slidably mounted on said hopper for movement through and beyond the mass of washers in the hopper to impale a stack of washers thereon and deliver the lowermost one of the stack of washers to a discharge station, means adjacent the path of the movement of said spear for engaging washers of a cluster interlocking with the washers on the spear for breaking the cluster and disentangling the washers not on the spear from the washers on the spear, means adjacent the path of movement of said spear and displaced from the mass of washers for firmly seating a single washer on said spear, and means for operating said spear.

7. In a washer feeding device, a washer hopper receiving a mass of washers, a spear slidably mounted on said hopper for movement through and beyond the mass of washers in the hopper to impale a stack of washers thereon and deliver the lowermost one of the stack of washers to a discharge station, means adjacent the path of the movement of said spear for engaging washers of a cluster interlocking with the washers on the spear for breaking the cluster and disentangling the washers not on the spear from the washers on the spear, means adjacent the path of the movement of the spear for securing the lowermost one of the washers on the spear against inadvertent dislodgment therefrom, and means for operating said spear, said operating means including means for suddenly changing the speed of the spear in its movement toward the discharge station to eject all but the lowermost one of the washers from the spear.

8. In a washer feeding device, a washer hopper receiving a mass of washers, a spear slidably mounted on said hopper for movement through and beyond the mass of washers in the hopper to impale a stack of washers thereon and deliver the lowermost one of the stack of washers to a discharge station, means adjacent the path of the movement of said spear for engaging washers of a cluster interlocking with the washers on the spear for breaking the cluster and disentangling the washers not on the spear from the washers on the spear, means adjacent the path of the movement of the spear for securing the lowermost one of the washers on the spear against inadvertent dislodgment therefrom, means for operating said spear, said operating means including means for suddenly changing the speed of the spear in its movement toward the discharge station to eject all but the lowermost one of the washers from the spear, and a washer discharge plate movable transversely to the path of the movement of the spear to engage and discharge the washer from the spear at the discharge station during the movement of the spear.

9. In a washer feeding device, a washer hopper receiving a mass of washers, a spear slidably mounted on said hopper for movement through and beyond the mass of washers in the hopper to impale a stack of washers thereon and deliver the lowermost one of the stack of washers to a discharge station, means adjacent the path of the movement of said spear for engaging washers of a cluster interlocking with the washers on the spear for breaking the cluster and disentangling the washers not on the spear from the washers on the spear, means adjacent the path of the movement of the spear for securing the lowermost one of the washers on the spear against inadvertent dislodgment therefrom, means for operating said spear, said operating means including means for suddenly changing the speed of the spear in its movement toward the discharge station to eject all but the lowermost one of the washers from the spear, and means operable transversely to the path of movement of the spear and engaging the mass of washers in the hopper to position the mass in the path of movement of the spear.

10. The combination of a hopper having an opening in one wall, a rod slidably mounted in the opposite wall in a position to project through said opening when the rod is actuated, said rod having a bevelled tip on the end which moves through the hopper, a slide mounted over the hopper, a guide restraining the movement of the slide transversely of the path of the rod, said slide having an opening at the end nearest the rod and of a size closely to encircle the rod when the rod is moved through the first mentioned opening in the wall of the hopper and the slide moved toward the rod, and interconnected drive links connected to the rod and slide.

11. The combination of claim 10 in further combination with yieldable spikes in adjacent spaced relation to the rod inside the hopper.

12. The combination of claim 10 in further combination with a brush inside the hopper and extending in juxtaposition to the periphery of the rod.

13. The combination of claim 10 in further combination with yieldable pads inside the hopper engaging the surface of the rod.

14. The combination of claim 10 in further combination with a bar slidably mounted outside the hopper for movement toward and from the rod transversely thereto, said bar having a hood at the end nearest the rod, said bar being guided in its sliding movement to position the hood over the rod and a drive link interconnected with the drive links to the rod and slide.

15. The combination of claim 10 in further combination with a support outside the hopper on the side of the first mentioned opening, a slide mounted on said support for movement in the plane of the rod toward and from the rod and having a portion movable into position above said rod in axial alignment therewith, and a drive link for said slide interconnected with the drive links for the rod and slide which moves transversely to the rod.

16. The combination of claim 10 in further combination with a support outside the hopper on the side of the first mentioned opening, a slide mounted on said support for movement in the plane of the rod toward and from the rod and having a portion movable into position above said rod in axial alignment therewith, and a drive link for said slide interconnected with the drive links for the rod and slide which moves transversely to the rod, and a chute terminating at its lower end adjacent the slide which is mounted for movement in the plane of the rod and in spaced relation to the rod when it is moved out of the first mentioned opening in the wall of the hopper.

17. A machine for assembling rotary fastener elements with washers comprising a non-rotatable washer hopper, a spear mounted for longitudinal movement upwardly through a disorderly mass of washers in said hopper means on said spear to impale a washer thereon during the upward movement of the spear through said disorderly mass in the hopper, means above and in the path of said spear as it moves upwardly for extracting a washer from said spear, and means for feeding an extracted washer and a fastener element relatively into telescoping engagement.

18. A machine for assembling rotary fastener elements with washers comprising a non-rotatable washer hopper, means mounted for movement through a disorderly mass of washers in said hopper to impale a washer thereon, means for feeding rotary fastener elements into axial alignment with said impaling means, and means for transferring a washer from said impaling means into telescopic engagement with an aligned rotary fastener element.

19. A machine for assembling rotary fastener elements with washers comprising a washer hopper, elongated means mounted for longitudinal movement through a disorderly mass of washers in said hopper to impale a washer thereon, means for feeding rotary fastener elements into axial alignment with said elongated impaling means, and means for transferring a washer from said elongated impaling means into telescopic engagement with an aligned rotary fastener element.

WILLIAM C. ANDERSON.

REFERENCES CITED

The following references are of record in the file of this patent:

UNITED STATES PATENTS

| Number | Name | Date |
|---|---|---|
| 330,925 | Richards | Nov. 24, 1885 |
| 497,493 | Dayton | May 16, 1893 |
| 665,092 | Henius | Jan. 1, 1901 |
| 1,693,650 | Latham | Dec. 4, 1928 |
| 2,152,591 | Hanneman | Mar. 28, 1939 |
| 2,278,689 | Chilton | Apr. 7, 1942 |
| 2,284,690 | Stern | June 2, 1942 |